3,360,046
CEMENTING COMPOSITIONS FOR MAXIMUM
THERMAL INSULATION
Billy J. Johnson, Duncan, and Charles Ray George, Stillwater, Okla., assignors to Halliburton Company, Duncan, Okla., a corporation of Delaware
No Drawing. Filed Feb. 8, 1965, Ser. No. 431,197
6 Claims. (Cl. 166—29)

ABSTRACT OF THE DISCLOSURE

This patent describes a novel cement slurry for use in wells for insulation purposes, said cement slurry comprising cement, about 25% to 40% silica flour, and from about 10% to 50% of vermiculite or perlite, all percentages being based on the weight of cement.

---

This invention relates to cement compositions particularly useful for thermal insulation.

In the oil industry there is increasing interest in the secondary and tertiary recovery of oil. These operations frequently involve some phase of thermal recovery where large amounts of heat energy are dissipated against the producing formation. In many cases, the thermal energy is provided by steam which is injected into the well. In steam injection, the economics of the recovery operation are dependent to a considerable degree on the amount of heat lost to the formation in moving the steam from the surface to the point of injection at the formation interface. For most efficient utilization of the steam, the cementing composition used to line the bore hole should posses good insulating properties. According to the present invention, there is now provided a novel cement composition possessing excellent thermal insulating properties. These cement compositions have been found to offer maximum thermal insulation at minimum cost and are effective in conserving thermal energy over a wide temperature range.

It is also important that an oil well cement have adequate compressive strength over the range of temperatures encountered in the well. As will be hereinafter shown, the cement slurry of this invention upon curing possesses strength which will enable it to withstand the forces encountered in an oil well.

It is an object of this invention to provide a novel cement slurry composition.

Another object of this invention is the provision of a cement composition possessing improved thermal insulating properties.

Yet another object of this invention is to provide a cement composition which will improve the economy of the thermal recovery of oil.

These and other objects of this invention will be apparent to those skilled in the art from the more detailed description of the invention which follows.

The novel cement slurry of this invention comprises cement plus about 25% to about 50% silica flour based on the weight of cement plus either vermiculite or perlite in an amount of from about 10% to about 150% based on the weight of cement. Preferably, the silica flour is used in an amount from about 30%. to about 40% based on the weight of cement.

The slurry also contains water in an amount effective to provide a pumpable mixture, that is, water sufficient to permit handling of the slurry by the standard pumping equipment employed in the well cementing industry. Generally, the water is present in the slurry in an amount from about 10 to about 30 gallons per sack of cement (94 lbs./sack).

Preferably, the vermiculite used has a bulk density of from about 7.0 to about 8.4 lbs./ft.$^3$ and a dominant screen fraction from about 16 to about 100 (Tyler). More preferably, the density is about 8.2 lb./ft.$^3$ and the size is about 30 to 50 mesh. While finer vermiculite can be used, more water is required to give the slurry mobility, thus making additional water which has to be dried from the set slurry before maximum insulation is effected. Coarse vermiculite creates larger pore spaces in which high temperature differentials are created. In this way, convection currents can develop and carry heat through the insulation.

The perlite used in the compositions of this invention preferably is of the expanded type, and may additionally contain raw ore fines. The bulk density of the perlite is generally from 5 to 40 pounds per cubic foot and has a screen fraction of about 4 to 100 mesh (Tyler).

In addition to the foregoing ingredients, the cement compositions of this invention may also contain gelling agents, such as bentonite as an optional ingredient. Normally, the gelling agent when present, is employed in the amount from about 0 to 6% by weight based on the total weight of the cement composition. Another material which may optionally be used in these compositions is sodium dimethyl benzene sulphate, added as a dispersing agent in about 0.5 to 1.5% by weight.

The thermal conductivity properties ($k$) of the cement compositions of this invention were determined in accordance with the following procedure. The cement test specimen is made up in a length of cylindrical casing, having therein a concentric cylindrical core section adapted to receive a heater. The casing is enclosed at the bottom. Prior to the introduction of cement slurry into the annular space between the core and the casing, two thermocouples are placed 180° apart on the outside surface of the core, 7 inches from the top. Two thermocouples are also placed at 180° apart on the inside surface of the casing, 7 inches from the top. The top of the casing is then closed with a circular plate containing holes through which the cement slurry can be introduced. After introducing the cement slurry through the holes, the cement is cured for 24 hours at 100° F. under atmospheric pressure and 100% humidity. Then, a heater is inserted into the core and the entire assembly is substantially submersed in a water bath. The bath is equipped with a thermocouple, which is connected to a multi-point recorder. One of the thermocouples on the outside surface of the heater core, hereinafter referred to as the "hot side, is placed in a second position on the multi-point recorder. The other thermocouple on the hot side is connected to a capacitrol. The two thermocouples on the inside surface of the outer casing, hereinafter referred to as the "cold side," are placed on third and fourth positions on the multi-point recorder. During the test, the bath temperature is maintained at 100° F. and is held constant by heating or the addition of cold water. When the cement sample has been slowly heated to 550° F., the temperature is regulated with the capacitrol. After the 550° temperature is reached, the capacitrol is turned up to 600° F. and a powerstat in the circuit is thereafter adjusted to maintain the temperature at 550° F. on the hot side. This puts a constant voltage through the heater and a constant flow of heat through the cement specimen. The wattage going through the cement specimen can be determined by the use of volt and amp meters in accordance with the equation $V \times A =$ watts. The temperature on the cold side is read from the multi-point recorder. The thermal conductivity ($k$) is calculated in accordance with the following general equation as set forth in Thermal Conductivity of Pipe Insulation, ASTM, Part 3, (1955), page 1093, (335-54 T);

$$k=\frac{qr_1 \log_e \frac{r_2}{r_1}}{At(T_1-T_2)}$$

wherein $k$=Thermal Conductivity, B.t.u. In/hr. sq. ft. ° F.
$Q$=Time rate of heat flow through Area, B.t.u./hr.
$A$=Area of the test surface of the test sample, sq. ft.
$T_1$=Temperature of the hot side, ° F. (in the foregoing, 550° F.)
$T_2$=Temperature of cold side, ° F.
$T$=Time, hours
$r_1$=Inner radius of the pipe insulation test specimen, inches
$R_2$=Outer radius of the pipe insulation test specimen, inches
$W$=Watts/Hour From the standardization of this equipment by the use of materials having known $k$ values, it has been found that the efficiency of the equipment is about 87% to 90%. Accordingly, the $k$ values referred to herein are normally up to about 13% higher than the true $k$ values.

The following examples are presented to illustrate the invention:

*Example I*

| | Percent |
|---|---|
| Cement | 20.8 |
| Silica flour | 6.2 |
| Perlite | 28.5 |
| Water | 44.5 |

| Test Interval Hours | Mean Temp., ° F. | "k" Value, B.t.u./Sq. Ft./Hr./° F./In. | | |
|---|---|---|---|---|
| | | 1 In. | 2 In. | 3 In. |
| 2 | 60 | 7.91 | 3.63 | 2.63 |
| 4 | 97 | 8.50 | 4.25 | 2.83 |
| 8 | 98 | 8.41 | 4.20 | 2.80 |
| 24 | 105 | 7.85 | 3.92 | 2.61 |
| 32 | 93 | 13.60 | 6.80 | 4.53 |
| 40 | 120 | 10.62 | 5.31 | 3.54 |
| 44 | 212 | 8.25 | 4.12 | 2.75 |
| 48 | 282 | 6.20 | 3.10 | 2.06 |
| 50 | 300 | 5.83 | 2.96 | 1.94 |
| 72 | 439 | 3.98 | 1.99 | 1.32 |
| 96 | 426 | 3.81 | 1.90 | 1.27 |
| 108 | 306 | 4.70 | 2.35 | 1.56 |
| 120 | 361 | 3.99 | 1.99 | 1.33 |
| 122 | 464 | 5.33 | 2.66 | 1.77 |
| 125 | 463 | 5.34 | 2.67 | 1.78 |
| 130 | 469 | 5.27 | 2.63 | 1.76 |
| 144 | 468 | 5.27 | 2.63 | 1.76 |
| 150 | 467 | 4.01 | 2.00 | 1.33 |

The physical properties of this composition after curing at 460° F. at 3000 p.s.i. are as follows:

| 24 Hours Compressive | | 24 Hours Shear |
|---|---|---|
| 2,295 | ¹ 4,050 | 645 |
| 72 Hours | | 72 Hours |
| 2,725 | ¹ 4,725 | 685 |
| 7 Days | | 7 Days |
| 2,265 | ¹ 4,425 | 650 |

¹ These values were obtained from test specimens that were cured the indicated time interval, then fired in a dry oven for 72 hours at 725° F.

STRENGTHS CURED AT ATMOSPHERIC PRESSURE

| | 80° F. | 100° F. | 200° F. |
|---|---|---|---|
| 24 Hrs: | | | |
| Compressive | 85 | 110 | 480 |
| Shear | 35 | 37 | 140 |
| 72 Hrs.: | | | |
| Compressive | 85 | 280 | 810 |
| Shear | 25 | 85 | 200 |

*Example II*

| | Percent |
|---|---|
| Cement | 34.6 |
| Silica flour | 10.4 |
| Vermiculite | 10.4 |
| Water | 44.6 |

TEST NO. 1

| Test Interval Hours | Mean Temp. ° F. | B.t.u./Sq. Ft./Hr./° F./In. | | |
|---|---|---|---|---|
| | | 1 In. | 2 In. | 3 In. |
| 6 | 264 | 7.10 | 3.55 | 2.36 |
| 24 | 468 | 4.00 | 2.00 | 1.33 |
| 48 | 467 | 4.01 | 2.00 | 1.33 |
| 60 | 445 | 3.93 | 1.96 | 1.31 |
| 66 | 318 | 5.50 | 2.75 | 1.83 |
| 72 | 431 | 3.59 | 1.79 | 1.19 |
| 84 | 420 | 3.70 | 1.85 | 1.23 |
| 108 | 426 | 3.63 | 1.81 | 1.21 |
| 120 | 434 | 3.57 | 1.78 | 1.19 |

TEST NO. 2

| Test Interval Hours | Mean Temp. ° F. | B.t.u./Sq. Ft./Hr./° F./In. | | |
|---|---|---|---|---|
| | | 1 In. | 2 In. | 3 In. |
| 2 | 47 | 4.78 | 2.39 | 1.59 |
| 6 | 47 | 4.78 | 2.39 | 1.59 |
| 18 | 110 | 6.06 | 3.03 | 2.02 |
| 24 | 324 | 3.90 | 1.95 | 1.30 |
| 27 | 453 | 4.14 | 2.07 | 1.38 |
| 30 | 428 | 3.79 | 1.89 | 1.26 |
| 44 | 533 | 3.04 | 1.52 | 1.01 |
| 48 | 504 | 3.22 | 1.61 | 1.07 |
| 51 | 530 | 3.06 | 1.53 | 1.02 |
| 56 | 536 | 3.03 | 1.51 | 1.01 |
| 72 | 617 | 2.63 | 1.31 | 0.87 |
| 96 | 509 | 3.15 | 1.57 | 1.05 |
| 114 | 320 | 3.98 | 1.99 | 1.32 |
| 126 | 352 | 3.90 | 1.95 | 1.30 |
| 138 | 362 | 3.80 | 1.90 | 1.26 |
| 155 | 355 | 3.87 | 1.93 | 1.29 |
| 162 | 386 | 3.84 | 1.92 | 1.28 |
| 172 | 376 | 3.94 | 1.97 | 1.31 |
| 177 | 397 | 3.74 | 1.87 | 1.28 |
| 189 | 401 | 3.69 | 1.84 | 1.23 |
| 329 | 452 | 3.85 | 1.92 | 1.28 |

The physical properties of this composition after curing at 460° F. at 3000 p.s.i. are as follows:

| 24 Hours Compressive | | 24 Hours Shear |
|---|---|---|
| 575 | ¹ 1,455 | 200 |
| 72 Hours | | 72 Hours |
| 425 | ¹ 990 | 145 |
| 7 Days | | 7 Days |
| 520 | ¹ 1,560 | 175 |

¹ These values were obtained from test specimens that were cured the indicated time interval, then fired in a dry oven for 72 hours at 725° F.

As shown by these data, the compositions of this invention possess good thermal insulating properties as evidenced by the low "$k$" values over a temperature range from 100° F. to 725° F.

As will be apparent to those skilled in the art, many other additives such as friction reducing agents, cement accelerators, retarders and the like may be used in the compositions of this invention.

The following is another cement slurry formulation within the scope of our invention:

*Example III*

| | | |
|---|---|---|
| Cement | lbs | 18,000 |
| Bentonite | lbs | 376 |
| Calcium chloride | lbs | 376 |
| Silica flour | lbs | 5,600 |
| Perlite | ft.³ | 600 |

Having fully described the invention, it is intended that it be limited only by the lawful scope of the appended claims.

We claim:

1. The method of lining the bore hole of a well with a thermally insulating cement sheath which comprises injecting into the well a novel pumpable cement slurry composition comprising cement, about 25% to 40% silica flour, from 10% to about 150% of a member selected from the group consisting of vermiculite and perlite, all percentages being based on the weight of cement, and water in an amount sufficient to provide a pumpable slurry, and thereafter permitting said composition to set in the bore hole to form a thermally insulating cement lining having adequate compressive strength over the range of temperatures encountered in the well, and being capable of withstanding the forces encountered in said well.

2. The method of claim 1 wherein there is additionally present as a gelling agent, bentonite in an amount up to about 6% by weight of the cement composition.

3. The method of lining the bore hole of a well with a thermally insulating cement sheath which comprises injecting into the well a novel pumpable cement slurry composition comprising cement, about 25% to 40% silica flour, from 10% to about 150% of a member selected from the group consisting of vermiculite and perlite, all percentages being based on the weight of cement, and from 10 gallons to about 30 gallons of water per sack of cement, based on a 94 lbs. sack, and permitting said composition to set in said bore hole to form a thermally insulating cement lining having adequate compressive strength over the range of temperatures encountered in the well, and being capable of withstanding the forces encountered in said well.

4. The method of claim 3 wherein the composition additionally contains as a gelling agent up to about 6% by weight of bentonite.

5. The method of lining the bore hole of a well to form a thermally insulating cement lining which comprises injecting into the well a novel pumpable cement slurry composition comprising cement, about 30% silica flour, about 30% vermiculite and about 128.7% water, all percentages being based on the weight of the cement, and thereafter permitting said composition to set in the bore hole to form a thermally insulating cement lining having adequate compressive strength over the range of temperatures encountered in the well, and being capable of withstanding the forces encountered in said well.

6. The method of lining the bore hole of a well to form a thermally insulating cement lining which comprises injecting into the well a novel pumpable cement slurry composition comprising cement, about 30% silica flour, about 137.3% perlite and about 215.3% water, all percentages being based by the weight of the cement, and thereafter permitting said composition to set in the bore hole to form a thermally insulating cement lining having adequate compressive strength over the range of temperatures encountered in the well, and being capable of withstanding the forces encountered in said well.

References Cited

UNITED STATES PATENTS

| | | | |
|---|---|---|---|
| 895,612 | 8/1908 | Baker | 166—57 |
| 2,148,717 | 2/1939 | Whitney | 166—57 X |
| 2,542,992 | 2/1951 | Clapper | 106—97 X |
| 2,585,366 | 2/1952 | Bollaert | 106—98 |
| 2,728,681 | 12/1955 | Clipson | 106—97 |
| 3,197,317 | 7/1965 | Patchen | 166—29 X |
| 1,585,801 | 5/1926 | Trumble | 166—24 X |
| 1,916,686 | 7/1933 | Sandstone | 166—24 |
| 3,220,863 | 11/1965 | Mayhew | 166—31 X |

ERNEST R. PURSER, *Primary Examiner.*

NILE C. BYERS, JR., *Examiner.*